US008114920B2

(12) United States Patent
Kim et al.

(10) Patent No.: US 8,114,920 B2
(45) Date of Patent: Feb. 14, 2012

(54) UV-CURABLE AQUEOUS EMULSION, PREPARATION THEREOF AND SOLVENTLESS COATING COMPOSITION COMPRISING THE SAME

(75) Inventors: Dong Soo Kim, Suwon-si (KR); Tae Yun Jeong, Ansan-si (KR); Su Dong Hong, Gunpo-si (KR); Jung Hyun Oh, Busan (KR)

(73) Assignee: Akzo Nobel Coatings International B.V., Arnhem (NL)

( * ) Notice: Subject to any disclaimer, the term of this patent is extended or adjusted under 35 U.S.C. 154(b) by 538 days.

(21) Appl. No.: 12/160,477

(22) PCT Filed: Jan. 15, 2007

(86) PCT No.: PCT/KR2007/000245
§ 371 (c)(1),
(2), (4) Date: Jul. 10, 2008

(87) PCT Pub. No.: WO01/27181
PCT Pub. Date: Apr. 19, 2001

(65) Prior Publication Data
US 2009/0012201 A1    Jan. 8, 2009

(30) Foreign Application Priority Data
Jan. 13, 2006  (KR) .................. 10-2006-0003743

(51) Int. Cl.
C08F 2/50 (2006.01)
C08J 3/28 (2006.01)
C08G 18/04 (2006.01)
C08G 18/06 (2006.01)
C08G 18/00 (2006.01)
C08G 71/04 (2006.01)

(52) U.S. Cl. ............... 522/85; 522/84; 522/86; 522/90; 522/93; 522/96; 522/97; 522/113; 522/114; 522/120; 522/121; 522/150; 522/151; 522/152; 522/173; 522/174; 522/178; 522/179; 522/183; 528/44; 528/48; 528/50; 528/59; 528/60; 528/66; 528/67; 528/69; 528/75; 528/80; 528/81; 528/83; 528/84; 528/85; 524/800; 524/839; 524/845; 524/846; 524/871; 524/875; 524/878; 524/879

(58) Field of Classification Search ............... 522/84, 522/86, 85, 90, 93, 96, 97, 113, 114, 120, 522/121, 150, 151, 152, 173, 174, 178, 179, 522/183; 528/44, 48, 50, 59, 60, 65, 66, 528/67, 69, 75, 80, 81, 83, 84, 85; 524/800, 524/839, 845, 846, 871, 875, 878, 879
See application file for complete search history.

(56) References Cited

U.S. PATENT DOCUMENTS

| | | |
|---|---|---|
| 4,287,039 A | 9/1981 | Buethe et al. |
| 5,135,963 A | 8/1992 | Haeberle |
| 6,011,078 A | 1/2000 | Reich et al. |
| 6,023,547 A | 2/2000 | Tortorello |
| 6,207,744 B1 | 3/2001 | Paulus et al. |
| 6,335,397 B1 | 1/2002 | Kokel et al. |
| 6,436,540 B1 | 8/2002 | Garcia et al. |
| 6,538,046 B1 | 3/2003 | Paulus et al. |
| 6,747,088 B1 | 6/2004 | Schwalm et al. |

FOREIGN PATENT DOCUMENTS

| | | | |
|---|---|---|---|
| EP | 0539030 A1 | | 4/1993 |
| JP | 5-065323 A | | 3/1993 |
| JP | 10182763 A | * | 7/1998 |
| JP | 11209448 A | * | 8/1999 |
| KR | 2004-23033 A | | 3/2004 |
| WO | 97/16469 A1 | | 5/1997 |
| WO | 01/27181 A1 | | 4/2001 |

OTHER PUBLICATIONS

Daicel Chemical Industries, Organic Product Sheet for PLACCEL products. [online], [retrived on Nov. 24, 2010]. Retrived from internet <URL: http://www.daicel.co.jp/kinouhin/english/category/caprolacton.html>.*
Bernquist et al.Novel acrylated building blocks for UV cruable polyurethane dispersions. RadTech Europe 2007 Conference and Exhibition. Nov. 13-15, 2007. [online]. [retrived on Nov. 23, 2010]. Retrieved from <URL:www.perstorp.com/.../novel_acrylated_building_blocks_for_uv_curable_polyurethane_dispersions_final.pdf.>.*
Japanese Patent Office Action issued in corresponding Japanese Application No. 2008-550247, dated Jun. 7, 2011.

* cited by examiner

*Primary Examiner* — Sanza McClendon

(57) ABSTRACT

The UV-curable aqueous coating composition is characterized by using a UV-curable aqueous emulsion obtained by urethane reaction with a mixture including a poly-carbonate polyol or polyester polyol; an isocyanate compound; a urethane-reactive carboxylic acid; a UV-curable acrylic oligomer having 2 to 9 functional acrylate groups; a UV-curable acrylic monomer; and a urethane-reactive acrylate without an organic solvent. The aqueous composition provides good environmental acceptability and satisfactory film properties comparable to those of the prior oily UV-curable coating composition and, therefore, it is useful for coating various plastics.

12 Claims, No Drawings

UV-CURABLE AQUEOUS EMULSION, PREPARATION THEREOF AND SOLVENTLESS COATING COMPOSITION COMPRISING THE SAME

This is a National Stage application under 35 U.S.C. §371 of PCT/KR2007/000245 filed on Jan. 15, 2007, which claims priority from Korean Patent Application 10-2006-0003743 filed on Jan. 13, 2006, all of which are incorporated herein by reference.

TECHNICAL FIELD

The present invention relates to a UV-curable aqueous emulsion, a method for preparing the same and a solventless coating composition comprising the same.

BACKGROUND ART

There have been developed various UV-curable aqueous coating compositions for plastics which contain no environmentally hazardous organic solvent. For example, German Patent No. 2936039 discloses a coating composition comprising a water-dispersible urethane acrylate prepared using amino sulphonic acid-alkali metal or—alkaline earth metal salt. However, this method provides a coating film having poor water resistance due to the alkali metal ion present on the film surface.

U.S. Pat. No. 4,287,039 discloses a method of dispersing a polyester urethane acrylate by using a dispersant. However, the film produced by this dispersion method shows poor water resistance, hardness, gloss due to the presence of moisture on the film.

U.S. Pat. Nos. 5,135,963, 6,011,078, 6,207,744, 6,335,397, 6,436,540, and 6,538,046 disclose curable polyurethane aqueous coating dispersions. The UV-curable polyurethane aqueous coating dispersions disclosed in these patents are obtained by using oligomers having larger molecular weights to ensure the stability of dispersion in water, but films obtained by using these dispersions have lower crosslinking densities, which does not fulfill plastic coating requirements.

DISCLOSURE OF INVENTION

Technical Problem

Accordingly, it is a primary object of the present invention to provide a UV-curable aqueous coating composition having good environmental acceptability and satisfactory plastic coating film properties comparable to those of an oil-based UV-curable coating composition.

Technical Solution

In accordance with one aspect of the present invention, there is provided a UV-curable aqueous emulsion comprising:
(a) a urethane reaction product of 1 to 10% by weight of a polycarbonate polyol or polyester polyol, 1 to 10% by weight of an isocyanate compound, 0.1 to 5% by weight of a reactive carboxylic acid, 1 to 10% by weight of a UV-curable acrylic oligomer having 2 to 9 functional acrylate groups and 5 to 20% by weight of a UV-curable acrylic monomer; and
(b) 0.1 to 20% by weight of a urethane-reactive acrylate, 0.01 to 1% by weight of a radical polymerization inhibitor and 55 to 75% by weight of water, based on the total weight of the UV-curable aqueous emulsion.

In accordance with one aspect of the present invention, there is provided a process for preparing a UV-curable aqueous emulsion comprising:
(a) subjecting a mixture of 1 to 10% by weight of a polycarbonate polyol or polyester polyol, 1 to 10% by weight of an isocyanate compound, 0.1 to 5% by weight of a reactive carboxylic acid, 1 to 10% by weight of a UV-curable acrylic oligomer having 2 to 9 functional acrylate groups and 5 to 20% by weight of a UV-curable acrylic monomer, based on the total weight of the UV-curable aqueous emulsion, to a urethane reaction in the presence of a metallic catalyst;
(b) adding 0.1 to 20% by weight of a urethane-reactive acrylate and 0.01 to 1% by weight of a radical polymerization inhibitor to the urethane reaction product obtained in step (a); and
(c) neutralizing the mixture obtained in step (b) with a basic compound and adding dropwise 55 to 75% by weight of water thereto.

In accordance with still another aspect of the present invention, there is provided a solventless UV-curable aqueous coating composition comprising (A) 90 to 99% by weight of the inventive UV-curable aqueous emulsion and (B) 1 to 10% by weight of a photoinitiator, based on the total weight of the composition.

MODE FOR THE INVENTION

<UV-Curable Aqueous Emulsion>

The inventive UV-curable aqueous emulsion is derived by subjecting a mixture of 1 to 10% by weight of a polycarbonate polyol or polyester polyol, 1 to 10% by weight of an isocyanate compound, 0.1 to 5% by weight of a reactive carboxylic acid, 1 to 10% by weight of a UV-curable acrylic oligomer having 2 to 9 functional acrylate groups, 5 to 20% by weight of a UV-curable acrylic monomer, 0.1 to 20% by weight of a urethane-reactive acrylate and 0.01 to 1% by weight of a radical polymerization inhibitor to a urethane reaction, based on the total weight of the UV-curable aqueous emulsion, in the presence of a metallic catalyst;

The method of preparing the UV-curable aqueous emulsion according to the present invention is described in detail as follows:

<Step (a)>

The reaction is carried out until the content of the isocyanate (NCO %) measured by the neutralization titration method is 2 to 5% by weight based on the product.

i) Polycarbonate Polyol or Polyester Polyol

Representative examples of the polycarbonate polyol used in the present invention include PCDL T4692 or PCDL T5651 (Asahi Kasei Co.).

The polyester polyol may include a polyester diol having 2 functional groups, which can be conventionally obtained by mixing an excessive amount of a diol with a dicarboxylic acid at a room temperature and subjecting the resulting mixture to an ester condensation reaction in the presence of a metallic catalyst at 150 to 215° C., preferably about 210° C. for about 24 hours, until the acid value of the product as measured using the neutralization titration method becomes 0.5 mg KOH/g or less. The diol may be used in an amount of 1.2 to 1.7 eq. based on the 1 eq. of the dicarboxylic acid.

Representative examples of the diol used in manufacture of the polyester diol include glycols having 2 to 15 carbon atoms such as neopentyl glycol, 1,4-butanediol, 1,6-hexanediol, diethyleneglycol, dipropyleneglycol, triethyleneglycol and tripropyleneglycol, and preferably neopentyl glycol. Representative examples of the dicarboxylic acid include maleic acid, maleic anhydride, fumaric acid, succinic acid, glutamic acid, adipic acid, isophthalic acid, phtalic anhydride, crotonic acid, ataconic acid, and a monoalkylester thereof, and preferably adipic acid or isophthalic acid.

The polycarbonate polyol and polyester polyol preferably has a number-average molecular weight of 1,000 to 3,000 g/mol and an OH value determined by back titration of 50 to 200 mg KOH/g.

The polycarbonate polyol or polyester polyol is used in an amount of 1 to 10%, preferably 4 to 8% by weight based on the total weight of the UV-curable aqueous emulsion.

ii) Isocyanate Compound

The isocyanate compound used in the present invention is preferably an aliphatic or aromatic isocyanate having two or more functional isocyanate groups, and representative examples thereof include 1,6-hexamethylene diisocyanate, isophorene diisocyanate, 1,4-cyclohexyl diisocyanate, 2,2,4-trimethyl hexamethylene diisocyanate and tetramethylxylene diisocyanate.

The isocyanate compound is used in an amount of 1 to 10%, preferably 3 to 7% by weight based on the total weight of the UV-curable aqueous emulsion. When the amount of the isocyanate compound is larger than 10% by weight, the cured coating film becomes brittle due to an excessively high crosslinking density and suffers from crack generation by heat or impact, and when less than 1% by weight, mechanical properties of the coating film become poor.

iii) Reactive Carboxylic Acid

Representative examples of the reactive carboxylic acid for introducing the hydrophilic group to polyurethane acrylate include dimethylolpropanoic acid (DMPA), dimethylolbutanoic acid (DMBA) and the like, and DMBA is preferred in order to keep the viscosity low during the reaction.

The reactive carboxylic acid is used in an amount of 0.1 to 5%, preferably 0.5 to 2% by weight based on the total weight of the UV-curable aqueous emulsion. When the amount of the reactive carboxylic acid is more than 5% by weight, the solubility in water increases resulting in the rise in the viscosity of an emulsion, and when less than 0.1% by weight, an emulsion may not be formed or the storage stability deteriorates.

iv) UV-Curable Acrylic Oligomer

In order to obtain satisfactory plastic coating film properties comparable to those of the prior oil-based UV-curable coating composition, a UV-curable acrylic oligomer is added and dispersed.

Representative examples of the UV-curable acylic oligomer used in the present invention include urethane acrylate, polyurethane acrylate, ester acrylate, polyester acrylate and a mixture thereof, having 2 to 9 functional acrylate groups, and commercially available materials include, for example, EB-1290, EB-830 (commercially available from SK-UCB, Korea) which have 6 functional acrylate groups and EB-4883, EB-9260, EB-9384 (commercially available from SK-UCB, Korea) which have 3 functional acrylate groups. The oligomer is used in an amount ranging from 1 to 10% by weight, preferably 6 to 9% by weight based on the total weight of the UV-curable aqueous emulsion.

The properties of the emulsion may be controlled by mixing a high functional oligomer having 4 or more functional acrylate groups and a low functional oligomer having 3 or less functional acrylate groups. The weight ratio of the low functional oligomer:the high functional oligomer may range from 1:0.5 to 1:3. When the ratio of the high functional oligomer exceeds the upper limit, the cured coating film becomes brittle due to an excessively high crosslinking density and suffers from crack generation by heat or impact, and when it less than the lower limit, the chemical and mechanical properties of the coating film become poor.

v) UV-Curable Acrylic Monomer

The UV-curable acrylic monomer used in the present invention acts as a reactive diluent instead of an organic solvent to control the curing rate and enhance the adhesion, as well as to control the viscosity of the reactant.

The UV-curable acylic monomer has no hydroxyl group and thus it is non-reactive. Representative examples thereof include an acrylic acid ester of an aliphatic polyhydric alcohol or alkoxy derivative thereof, for example trimethylolpropane triacrylate (TMPTA), tripropyleneglycol diacrylate (TPGDA), 1,6-hexamethylenediol diacrylate (HDDA), 1,4-butanediol diacrylate (1,4-BDDA), 1,3-isobutanediol diacrylate, isobonyl acrylate (IBOA) or a mixture thereof.

The monomer is used in an amount ranging from 5 to 20% by weight, preferably 12 to 16% by weight based on the total weight of the UV-curable aqueous emulsion. When the amount is more than 20% by weight, the curing rate becomes low, and mechanical and chemical properties of the coating film become poor, and when less than 5% by weight, the viscosity of the react become higher while UV-curable emulsion becomes unstable.

In the present invention, the UV-curable acrylic monomer may be employed in an amount ranging from 50 to 500% by weight, based on the UV-curable acrylic oligomer.

vi) Metallic Catalyst

The reaction of preparing the UV-curable aqueous emulsion may be accelerated in the presence of a metallic catalyst. Representative examples of the metallic catalyst used in the reaction include a tin-based compound such as dibutyltin dilaurylate and an amine compound such as DBU (1,8-diazabicyclo[5,4,0]undec-7-ene) and the like, and the metallic catalyst may be used in a catalytically effective amount.

<Step (b)>

In step (b), the reaction is carried out at 70 to 90° C. until the isocynate peak at 2,260 cm$^{-1}$ in a fourier transform infrared spectrum (FT-IR) disappears completely.

vii) Urethane-Reactive Acrylate

The urethane-reactive acrylate used in the present invention preferably has one or more hydroxyl groups and 1 to 6 functional acrylate groups per molecule. Representative examples of the urethane-reactive acrylate used in the present invention include 2-hydroxyethyl acrylate (2-HEA), 2-hydroxypropyl acrylate (2-HPA), caprolactone acrylate (Tone M-100, commercially available from U.C.C), a mixture of pentaerythritol triacrylate and pentaerythritol tetraacrylate, a mixture of dipentaerythritol pentaacrylate and dipentaerythritol hexaacrylate and the like. Preferred are a mixture of pentaerythritol triacrylate and pentaerythritol tetraacrylate and a mixture of dipentaerythritol pentaacrylate and dipentaerythritol hexaacrylate. In each mixture, the content of pentaerythritol triacrylate or dipentaerythritol tetraacrylate preferably ranges from 50 to 60% by weight.

The urethane-reactive acrylate is used in an amount ranging from 0.1 to 20% by weight, preferably 1 to 10% by weight, based on the total weight of the UV-curable aqueous emulsion.

viii) Radical Polymerization Inhibitor

Representative examples of the radical polymerization inhibitor used in the present invention include hydroquinone, p-methoxyphenol, nitrobenzene, BHT (2,6-di-tetra-butyl-4-methylphenol) and the like.

The radical polymerization inhibitor is used in an amount ranging from 0.01 to 1% by weight, preferably 0.1 to 5% by weight based on the total weight of the UV-curable aqueous emulsion.

<Step (c)>

In order to enhance the aqueous dispersion stability, carboxyl groups in the urethane-reaction product obtained in step (b) may be neutralized in part or as a whole using a basic compound, and water is added dropwise thereto in an amount of 55 to 75% by weight, based on the total weight of the UV-curable aqueous emulsion to obtain an aqueous emulsion having a solid content of 25 to 45% by weight.

Representative examples of the basic compound include organic or inorganic bases, for example alkali or, alkaline-earth metal hydroxide, oxide, carbonate or hydrogen carbonate, and ammonia or primary, secondary or tertiary amine and the like, preferably sodium hydroxide or tertiary amine such as triethylamine, triethanolamine, dimethylethanolamine or diethylethanolamine. The basic compound used in the reaction may be in the range of 0.8 to 1 eq. based on the carboxylic acid used.

<UV-Curable Aqueous Coating Composition>

The inventive UV-curable aqueous coating composition comprises (A) 90 to 99% by weight of a UV-curable aqueous emulsion prepared in accordance with the inventive method and (B) 1 to 10% by weight of a photoinitiator, based on the total weight of the composition Representative examples of the photoinitiator which functions to generate radicals by UV irradiation to initiate the crosslinking of unsaturated hydrocarbons include 1-hydroxyl cyclohexyl phenyl ketone (IRGACURE 184; commercially available from Ciba Specialty Chemicals), bis(2,4,6-trimethyl benzoyl) phenyl phosphine oxide (IRGACURE 819; commercially available from Ciba Specialty Chemicals), 2,4,6-trimethylbenzoyl diphenyl phosphine (TPO), 2-hydroxy-2-methyl-1-phenyl-1-propane (DAROCUR 1173; commercially available from CIBA-GEIGY), IRGACURE 500, benzophenone (BP) and a mixture thereof, and it is used in an amount ranging from 1 to 10% by weight, preferably from 2 to 6% by weight based on the total weight of the composition.

In order to enhance the slip and gloss characteristics of the coating film, the inventive coating composition may further comprise a leveling agent in an amount ranging from 0.1 to 5% by weight based on the total weight of the composition, the leveling agent being any of the conventional materials used in the coating composition, preferably TEGO RAD 2200N (commercially available from Tego chemie Co.), BYK-333, BYK-347, BYK-348 (commercially available from BYK chemie Co.), and a mixture thereof.

In addition, so as to enhance the property of the coating film, the inventive coating composition may further comprise additives such as XP-1045, XP-0596 and XP-0746 (nano-silica containing compound) (commercially available from hanse chemie Co.) in an amount ranging from 0.1 to 2% by weight based on the total weight of the composition.

<Coating Film>

In accordance with the present invention, the coating film may be prepared by spray coating, dip coating, flow coating or spin coating the inventive coating composition on the surface of a substrate to form a UV-curable film thereon, drying the coating layer at room temperature and curing the dried layer by means of UV irradiation.

The inventive coating film may have a thickness ranging from 20 to 50 μm, and have improved properties in term of adhesion, pencil hardness, gloss and moisture-, chemical-, abrasion- and acid-resistance.

As described above, the inventive UV-curable coating composition comprising the inventive UV-curable aqueous emulsion having no organic solvent is capable of providing a coating film having good environmental acceptability and satisfactory properties comparable to those of the prior oil-based UV-curable coating composition. Accordingly, it is useful as environmentally friendly plastic aqueous coating products.

The following Examples and Comparative Examples are given for the purpose of illustration only and are not intended to limit the scope of the invention.

<Preparation of Polyester Diol>

Preparation Example 1

535 g of neopentyl glycol, 665 g of adipic acid and 0.3 g of dibutyl tin oxide were added to a 4-neck round bottom flask, and the temperature was raised to 150° C. under a nitrogen atmosphere. After the condensation reaction started, the temperature was maintained at 150° C. for 1 hour, the reaction temperature was then raised to 210° C. at a rate of 5° C./min, and at 210° C., 300 g of toluene was added thereto. The resulting mixture was subjected to an azeotropic distillation until the acid value of the reaction product became 0.5 mg KOH/g or less. After completion of the reaction, residual toluene, water and unreacted starting materials were removed at 180° C. under a vacuum to obtain a polyester diol having a number-average molecular weight of about 1,000 g/mol calculated from the hydroxyl group value.

Preparation Example 2

The procedure of Preparation Example 1 was repeated except for using 550 g of neopentyl glycol and a combination of 370 g of adipic acid and 280 g of isophthalic acid as the dicarboxylic acid component, to obtain a polyester diol having a number-average molecular weight of 2,000 g/mol.

<Preparation of UV-Curable Aqueous Emulsion>

Preparation Example 3

27 g and 53 g of polyester diols obtained in Preparation Example 1 and 2, respectively, 18 g of dimethylolbutylic acid (DMBA) as a urethane-reactive carboxylic acid, 64 g of isophorene diisocyanate (IPDI), 80 g of EB-1290 (SK-UCB) as a UV-curable acrylic oligomer, 70 g of trimethylolpropane triacrylate (TMPTA) and 60 g of hexamethylene diacrylate (HDDA) as a UV-curable monomer were added to a 4-neck round bottom flask while stirring. Then, 0.1 g of p-methoxyphenol (HQ-MME) as a radical polymerization inhibitor and 0.1 g of dibutyltin dilaurylate (DBTDL) as a reaction catalyst were added thereto, and the resulting mixture was stirred at 85° C. When the content of isocyanate (NCO %) reached 2.2%, 17 g of 2-hydroxyethylacrylate (2-HEA) as a urethane-reactive acrylate and 0.1 g of DBTDL as a catalyst were successively added and the resulting mixture was reacted at 85° C. until the isocyanate peak on an FT-IR scan disappeared. The reaction mixture was cooled to 50° C. and 11 g of triethylamine(TEA) was added dropwise thereto over 10 minutes, and then the resulting mixture was kept at the same temperature for 1 hour to neutralize the mixture. 600 g of distilled water was then added thereto with vigorous agitating to obtain a UV-curable aqueous emulsion containing a polyurethane acrylate dispersing agent having 2 functional acrylate groups.

Preparation Example 4

The procedure of Preparation Example 3 was repeated except for using 40 g of EB-1290 and 40 g of EB-9260(SK-UCB) instead of 80 g of EB-1290, and 80 g of TMPTA and 50 g of HDDA instead of 70 g of TMPTA and 60 g of HDDA as the UV-curable monomer component, to obtain a UV-curable aqueous emulsion containing a polyurethane acrylate dispersing agent having 2 functional groups.

Preparation Example 5

The procedure of Preparation Example 3 was repeated except for using 40 g of EB-1290 and 40 g of EB-9260 instead of 80 g of EB-1290, and 70 g of TMPTA, 40 g of HDDA and 35 g of isobonyl acrylate (IBOA) instead of 70 g of TMPTA and 60 g of HDDA, to obtain a UV-curable aqueous emulsion containing a polyurethane acrylate dispersing agent having 2 functional groups.

Preparation Example 6

The procedure of Preparation Example 3 was repeated except for using 19 g and 38 g of polyester diols obtained in Preparation Example 1 and 2, respectively, 46 g of IPDI, 60 g of TMPTA and 70 g of HDDA as the UV-curable monomer component, 66 g of a mixture (1/1 mole ratio) of pentaerythritol triacrylate and pentaerythritol tetraacrylate as the urethane-reactive acrylate component, and 8 g of TEA, to obtain a UV-curable aqueous emulsion containing a polyurethane acrylate dispersing agent having 6 functional groups.

Preparation Example 7

The procedure of Preparation Example 6 was repeated except for using 40 g of EB-1290 and 40 g of EB-9260 as the UV-curable oligomer, and 60 g of TMPTA and 60 g of HDDA as the UV-curable monomer component, to obtain a UV-curable aqueous emulsion containing a polyurethane acrylate dispersing agent having 6 functional groups.

Preparation Example 8

The procedure of Preparation Example 6 was repeated except for using 30 g of EB-1290 and 30 g of EB-9260 as the UV-curable oligomer, and 60 g of TMPTA, 50 g of HDDA and 50 g of IBOA as a UV-curable monomer, to obtain a UV-curable aqueous emulsion containing a polyurethane acrylate dispersing agent having 6 functional groups Preparation Example 9

The procedure of Preparation Example 6 was repeated except for using 15 g and 31 g of polyester diols obtained in Preparation Example 1 and 2, respectively, 10 g of dimethylolbutylic acid (DMBA), 37 g of IPDI, and 90 g of a mixture of dipentaerythritol pentaacrylate and dipentaerythritol hexaacrylate as the urethane-reactive acrylate component to obtain a UV-curable aqueous emulsion containing a polyurethane acrylate dispersing agent having 10 functional groups.

Preparation Example 10

The procedure of Preparation Example 9 was repeated except for using 30 g of EB-1290 and 40 g of EB-9260 as the UV-curable oligomer, and 60 g of TMPTA and 70 g of HDDA as the UV-curable monomer, to obtain a UV-curable aqueous emulsion containing a polyurethane acrylate dispersing agent having 10 functional groups.

Preparation Example 11

The procedure of Preparation Example 9 was repeated except for using 30 g of EB-1290 and 40 g of EB-9260 as the UV-curable oligomer, and 50 g of TMPTA, 50 g of HDDA and 50 g of IBOA as the WV-curable monomer, to obtain a UV-curable aqueous emulsion containing a polyurethane acrylate dispersing agent having 10 functional groups.

<Preparation of UV-Curable Aqueous Coating Composition>

Examples 1 to 9

95 g of the UV-curable aqueous emulsion obtained in Preparation Example 3, 3% by weight of DAROCUR 1173 (CIBA-GEIGY) as a photoinitiator and 1.4% by weight of BYK-333 and 0.6% by weight of BYK-347(BYK chemie) as a leveling agent were mixed, and the resulting mixture was stirred for 30 minutes to obtain a solventless UV-curable coating composition (Example 1).

A similar procedure was repeated using each of the UV-curable aqueous emulsion obtained in Preparation Examples 4 to 11, to obtain eight solventless UV-curable coating compositions (Examples 2-9).

Comparative Example 1

In accordance with the composition of a conventional UV-curable coating composition, 15% by weight of EB 1290, 11% by EB 9260, 6% by weight of trimethylolpropane triacrylate and 7% by weight of methylenediol diacrylate were added to a mixture of 30% by weight of toluene, 15% by weight of methyl isobutyl ketone, 5% by weight of ethyl acetate and 5% by weight of ethyl cellosolve while stirring. Then, 5% by weight of DAROCUR 1173 as a photoinitiator and 1% by weight of BYK-333 (BYK chemie) as a leveling agent were added thereto, and the resulting mixture was stirred for 30 min to obtain a UV-curable coating composition (non-volatile content, 45%).

<Preparation of Coating Films>

Examples 10 to 18

Each of the UV-curable coating compositions obtained in Examples 1 to 9 was coated on a polycarbonate substrate coated with a UVP-9500SI(S) (SSCP Co., Ltd) by spray coating, the resulting coating was dried at 60° C. for 5 min, and cured twice at a line speed of 10/min under a light intensity of 380 mJ/cm$^2$ with a Fusion Lamp (Fusion System Co.), to obtain a total of nine coating films.

Comparative Example 2

The procedure of Examples 10 to 18 was repeated except for using the UV-curable coating composition obtained in Comparative Example 1 and drying at 60° C. for 1 or 2 min to remove the organic solvent to obtain a coating film.

<Assay of Film Properties>

The physical and chemical characteristics of the coating films obtained in Examples 10 to 18 and Comparative Example 2 were evaluated in accordance with the following methods.

(1) Adhesion Property: ASTM D3359-87

A coating film was cut in a checkered pattern at 1 mm intervals to form 100 1 mm×1 mm squares. An adhesive test tape was firmly attached to the formed pattern and removed with a sharp peeling motion, which was repeated three times. The state of the pattern was examined and the results were evaluated according to the following criteria:

5B: no peeling at the cut edge or within the patterned area
4B: slight peeling at the cut edge and peeling of less than 5% of the patterned area
3B: some peeling and breakage at the cut edge and peeling less than 15% of the patterned area (2) Pencil Hardness: ASTM D3363-74

A test coating film was scratched with a pencil of varying hardness under a constant pressure at an angle of 45 degrees, which was repeated five times. The hardness value of the pencil produced only one scratch or breakage of the coating layer is referred to as the pencil hardness.

(3) Gloss

The gloss value of a test coating film was measured at light acceptance and incident angles of 60 degrees with a BYK-GARDNER glossmeter, and the result obtained was expressed as a percentage value based on the gloss value of the base plane of 100.

(4) Abrasion Resistance

The surface of a test coating film was rubbed with an eraser under a 500 g-load at a rate of 40 times/min until the substrate surface became visible with the naked eye, and the abrasion resistance was expressed in terms of the number of rubbing.

◎; 2,000 times or more, ○; 1,700 to 2,000 times or more (5) Chemical Resistance

The surface of a test coating film was dipped in 99.3% methanol, followed by rubbing with an eraser under a 500 g-load at a rate of 40 times/min until the substrate surface became visible with the naked eye, and the chemical resistance was expressed in terms of the number of rubbing.

◎; 300 times or more, ○; 260 to 300 times or more (6) Moisture Resistance

The degree of deformation and the state of adhesion were evaluated after exposing a test coating film to a condition of 50° C. and 95% relative humidity for 72 hours.

◎; excellent, ○; good (7) Acid Resistance

The degree of deformation and the state of adhesion were evaluated after treating a test coating film with a standard pH 4.6 solution for 72 hours.

◎; excellent, ○; good (8) UV Test (QUV)

The degree of deformation and the state of adhesion property were evaluated after keeping a test coating film for 72 hours with a UV tester (QUV, Q-Pannel).

The physical properties of the coating films thus measured are showed in Table 1.

TABLE 1

| | Example 10 | Example 11 | Example 12 | Example 13 | Example 14 | Example 15 | Example 16 | Example 17 | Example 18 | Comparative Example 2 |
|---|---|---|---|---|---|---|---|---|---|---|
| Adhesion property | 5B | 5B | 5B | 5B | 5B | 5B | 5B | 5B | 5B | 5B |
| Pencil hardness | H | HB~H | HB | H | H | H | 2H | H~2H | H~2H | HB |
| Gloss(60°) | 125 | 123 | 125 | 127 | 124 | 126 | 126 | 127 | 125 | 124 |
| Abrasion resistance | ◎ | ◎ | ○ | ◎ | ◎ | ◎ | ◎ | ◎ | ◎ | ○ |
| Chemical resistance | ◎ | ○ | ○ | ◎ | ◎ | ◎ | ◎ | ◎ | ◎ | ○ |
| Moisture resistance | ◎ | ◎ | ◎ | ◎ | ◎ | ◎ | ◎ | ◎ | ◎ | ◎ |
| Acid Resistance | ◎ | ◎ | ◎ | ◎ | ◎ | ◎ | ◎ | ◎ | ◎ | ◎ |
| UV Test | 1.5 | 1.3 | 1.1 | 2.3 | 2.1 | 1.9 | 2.82 | 2.68 | 2.2 | 2.78 |

As shown in Table 1, the coating films obtained using the inventive coating compositions exhibit equal or better properties in terms of adhesion property, pencil hardness, gloss, abrasion resistance, chemical resistance, moisture resistance and acid resistance, as compared to those obtained using conventional compositions while the inventive coating film are generated without any environmental hazard.

While the invention has been described with respect to the above specific embodiments, it should be recognized that various modifications and changes may be made to the invention by those skilled in the art which also fall within the scope of the invention as defined by the appended claims.

The invention claimed is:

1. A UV-curable aqueous emulsion comprising:
   (a) a urethane reaction product of 1 to 10% by weight of a polycarbonate polyol or polyester polyol, 1 to 10% by weight of an isocyanate compound, 0.1 to 5% by weight of a reactive carboxylic acid, 1 to 10% by weight of a UV-curable acrylic oligomer having 2 to 9 functional acrylate groups and 5 to 20% by weight of a UV-curable acrylic monomer; and
   (b) 0.1 to 20% by weight of a urethane-reactive acrylate, 0.01 to 1% by weight of a radical polymerization inhibitor and 55 to 75% by weight of water, based on the total weight of the UV-curable aqueous emulsion,
   wherein the UV-curable acrylic oligomer is a mixture of an oligomer having 4 or more functional acrylate groups and an oligomer having 3 or less functional acrylate groups, and
   wherein the UV-curable acrylic monomer is selected from the group consisting of trimethylolpropane triacrylate (TMPTA), tripropyleneglycol diacrylate (TPGDA), 1,6-hexamethylenediol diacrylate (HDDA), 1,4-butanediol diacrylate (1,4-BDDA), 1,3-isobutanediol diacrylate, isobonyl acrylate (IBOA) and a mixture thereof.

2. The UV-curable aqueous emulsion of claim 1, wherein the polycarbonate polyol or polyester polyol has a number-average molecular weight of 1,000 to 3,000 g/mol and an OH value of 50 to 200 mg KOH/g.

3. The UV-curable aqueous emulsion of claim 1, wherein the reactive carboxylic acid is dimethylolpropanoic acid (DMPA) or dimethylolbutanoic acid (DMBA).

4. The UV-curable aqueous emulsion of claim 1, wherein the weight ratio of the oligomer having 3 or less functional acrylate groups to the oligomer having 4 or more functional arylate groups is 1:0.5 to 1:3.

5. The UV-curable aqueous emulsion of claim 1, wherein the UV-curable acrylic monmer is in an amount ranging from 50 to 500% by weight, based on the UV-curable acrylic oligomer.

6. The UV-curable aqueous emulsion of claim 1, wherein the urethane-reactive acrylate is 2-hydroxyethyl acrylate (2-HEA), 2-hydroxypropyl acrylate (2-HPA), caprolactone acrylate, a mixture of pentaerythritol triacrylate and pentaerythritol tetraacrylate, or a mixture of dipentaerythritol pentaacrylate and dipentaerythritol hexaacrylate.

7. A process for preparing a UV-curable aqueous emulsion comprising:
   (a) subjecting a mixture of 1 to 10% by weight of a polycarbonate polyol or polyester polyol, 1 to 10% by weight of an isocyanate compound, 0.1 to 5% by weight of a reactive carboxylic acid, 1 to 10% by weight of a UV-curable acrylic oligomer having 2 to 9 functional acrylate groups and 5 to 20% by weight of a UV-curable acrylic monomer, based on the total weight of the UV-curable aqueous emulsion, to a urethane reaction in the presence of a metallic catalyst, wherein the UV-curable acrylic oligomer is a mixture of an oligomer having 4 or more functional acrylate groups and an oligomer having 3 or less functional acrylate groups, and wherein the UV-curable acrylic monomer is selected from the group consisting of trimethylolpropane triacrylate (TMPTA), tripropyleneglycol diacrylate (TPGDA), 1,6-hexamethylenediol diacrylate (HDDA), 1,4-butanediol diacrylate (1,4-BDDA), 1,3-isobutanediol diacrylate, isobonyl acrylate (IBOA) and a mixture thereof;

(b) adding 0.1 to 20% by weight of a urethane-reactive acrylate and 0.01 to 1% by weight of a radical polymerization inhibitor to the urethane reaction product obtained in step (a); and (c) neutralizing the mixture obtained in step (b) with a basic compound and adding dropwise 55 to 75% by weight of water thereto.

8. The process of claim 7, wherein the reaction in step (a) is carried out until the content of the isocyanate (NCO %) become 2 to 5% by weight based on the product.

9. The process of claim 7, wherein the basic compound is selected from the group consisting of alkali or alkaline-earth metal hydroxide, oxide, carbonate or hydrogen carbonate, and ammonia or primary, secondary or tertiary amine.

10. The process of claim 7, wherein the metallic catalyst is a tin-based compound or an amine compound.

11. A UV-curable aqueous coating composition comprising (A) 90 to 99% by weight of a UV-curable aqueous emulsion of claim 1 and (B) 1 to 10% by weight of a photoinitiator, based on the total weight of the composition.

12. A plastic article having a cured coating film of the coating composition according to claim 11.

* * * * *